(No Model.)
O. D. McCLELLAN.
GAS BURNER.
No. 313,508. Patented Mar. 10, 1885.
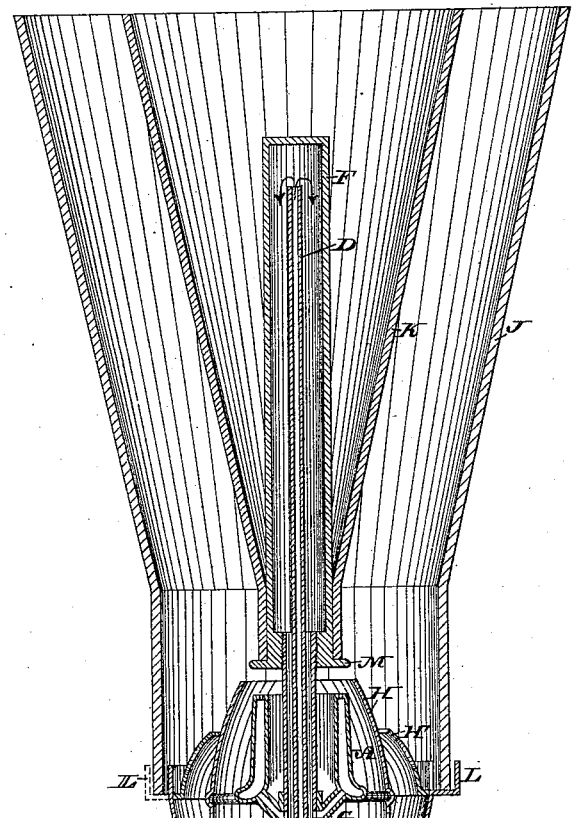
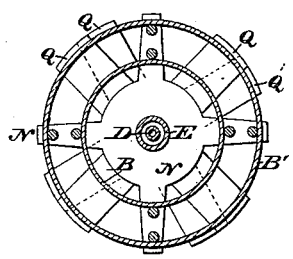
WITNESSES:
A. P. Grant
W. F. Kircher
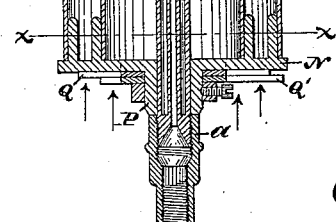
INVENTOR:
Oscar D. McClellan,
BY John A. Diedersheim,
ATTORNEY.

UNITED STATES PATENT OFFICE.

OSCAR D. McCLELLAN, OF PHILADELPHIA, PENNSYLVANIA, ASSIGNOR, BY DIRECT AND MESNE ASSIGNMENTS, TO THE SOLAR GAS LIGHT AND HEATING COMPANY, OF SAME PLACE.

GAS-BURNER.

SPECIFICATION forming part of Letters Patent No. 313,508, dated March 10, 1885.

Application filed December 28, 1883. (No model.)

*To all whom it may concern:*

Be it known that I, OSCAR D. MCCLELLAN, a citizen of the United States, residing in the city and county of Philadelphia, State of Pennsylvania, have invented a new and useful Improvement in Gas-Burners, which improvement is fully set forth in the following specification and accompanying drawings, in which—

Figure 1 is a central vertical section of a gas-burner embodying my invention. Fig. 2 is a horizontal section in line $x\,x$, Fig. 1.

Similar letters of reference indicate corresponding parts in the two figures.

My invention consists in forming a gas-burner with means for primarily heating the gas and the air necessary for combustion, whereby the illuminating power thereof is increased.

It also consists of means for spreading the flame, thus increasing the illuminating-surface thereof.

It also consists of a novel air switch or regulator.

Referring to the drawings, A represents a burner of the order of an argand, and B represents a cylinder or tube, which has secured within it a slotted plate or spider, C, for sustaining the burner.

D represents a vertical pipe, which, open at top and bottom, is connected, as at $a$, with a gas pipe or fixture, and inclosed in a tube, E, which is supported on the connection $a$, and passes centrally through the spider C and burner A, said pipe and inclosing-tube rising above the burner. The upper end of the tube E has connected with it a tube or retort, F, which is closed at top, and the pipe D is extended upwardly into said tube F, it being noticed that a space exists between the pipe D and tube E and between the pipe D and tube F. The burner communicates with the tube E by means of the passages G at the base of the burner, said passages being secured to the burner and tube, and also serving to sustain the burner.

H H' represent cones which surround the burner, the cone H being sustained on the cylinder B and the cone H' on an exterior cylinder, B', the latter inclosing the cylinder B and having an air-space between them.

J represents a chimney, of the form of an inverted cone, and K represents a reflector, which is of the form of an inverted cone, inclosing the tube F and inclosed by the chimney J. The chimney is formed of glass or other transparent material and the reflector of porcelain or other material well calculated to endure heat and having a polished or reflective exterior. The chimney is supported on the lugs or projections L of the core H' and the reflector on a flange or rim, M, at the base of the tube or retort F, said rim extending horizontally above the burner and constituting a deflector for the flame.

The operation is as follows: Gas enters the pipe D and passes through the same to the top of the tube or retort F, then descends said tube into the tube E and enters the passages G, thus reaching the burner. When the gas is ignited, the flame impinges against the deflector M, and is directed into the chimney J, the effect whereof is to spread the flame in flaring form, thus producing a large illuminating-surface and corresponding light, which, assisted by the deflector, makes the light of great brilliancy. The heat generated at the base of the tube or retort F and that within the reflector is imparted to said tube F and the gas-pipe D, the shape of the reflector causing it to be highly heated by the flame, whereby the gas traverses the heated inner surface of said pipe D and both the inner surface of the tube F and exterior surface of the pipe D, and, furthermore, the heated inner surface of the tube E, and so enters the burner in a highly-heated condition, whereby its illuminating power is vastly increased. Air is admitted to the burner from the cylinder B, and to the cones H H' and the chimney J from the cylinder B', the air entering the cylinders at their bases. Coming in contact with the heated cylinders B B' and the hot cones H H' the air becomes superheated, and in this condition reaches the flame, thus furthering the combustion and increasing the brilliancy of the flame. The cylinders are provided with a slotted plate or spider, N, which supports said cylinders, and is supported on the connection a. The center of the under side of said spider N is formed with a downwardly-extending boss, P, on which are mounted two rotating spiders or register-wheels, Q Q, the latter being undermost. These register-wheels are provided with flat radial arms the office of which is to cover or uncover the openings in spider N to any desired extent. When the corresponding arms of register-wheels Q Q' lie, respectively, under and over one another, the openings in spider P are uncovered, and the draft is at its maximum. When said wheels Q Q' are turned in opposite directions to a greater or less degree, the said openings are covered to a proportional extent. When one of them alone is thus turned, one half of the openings (in number) will be closed in proportion to the degree of said turning, while the other half will be left unclosed. By turning both of these register-wheels far enough all of said openings will be completely closed.

I am aware that it is not new to cause gas to pass up through the inner one of two concentric pipes and afterward pass downward through a series of supplemental pipes to the outer one of said concentric pipes, whereby it is supplied to burners surrounding said concentric pipes, the gas being heated by said burner as it passes up and also as it descends. This I do not claim.

The receptacle employed by me at the top of the pipes allows much more space for the gas than the supplemental pipes would furnish and is more easily and cheaply manufactured.

Having thus described my invention, what I claim as new, and desire to secure by Letters Patent, is—

1. The combination of the concentric gas-pipes D and E with the tube or retort F, which is closed at top and attached at bottom to the upper end of the outer gas-pipe, E, said tube or retort extending above the top of the inner gas-pipe, D, and surrounding the same so as to afford a passage for the gas downward from said inner pipe, D, to said outer pipe, E, substantially as set forth.

2. The combination, with the inner gas-pipe, D, and the outer gas-pipe, E, of a retort or tube, F, which is attached to the upper end of said outer pipe, and affords a passage between the two pipes, said retort or tube F being provided at its lower end with a flange which forms a deflector, M, arranged above the burner, substantially as set forth.

3. An inner gas-pipe and an outer gas-pipe, in combination with a retort or tube closed at the top, which is attached to the upper end of said outer pipe and affords communication between said pipes, a deflector formed on the lower end of said retort, and a reflector supported on said deflector, substantially as set forth.

4. A gas-burner and pipes for supplying the same, in combination with a deflector, M, supported by one of said pipes above said burner, and a conoidal deflector, K, which tapers downward to a neck that rests upon said deflector, substantially as set forth.

OSCAR D. McCLELLAN.

Witnesses:
JOHN A. WIEDERSHEIM,
A. P. GRANT.